United States Patent
Kim et al.

(10) Patent No.: US 7,110,802 B1
(45) Date of Patent: Sep. 19, 2006

(54) BELT CLIP DEVICE FOR MOBILE COMMUNICATION TERMINAL UNIT

(75) Inventors: Hong Joo Kim, Seoul (KR); Hae Seock Yang, Kyunggi-do (KR)

(73) Assignee: LG Information and Communications, Ltd., Seoul (KR)

( * ) Notice: Subject to any disclaimer, the term of this patent is extended or adjusted under 35 U.S.C. 154(b) by 585 days.

(21) Appl. No.: 09/639,120

(22) Filed: Aug. 16, 2000

(30) Foreign Application Priority Data

Aug. 17, 1999 (KR) ............................... 1999-33933
Nov. 22, 1999 (KR) ............................... 1999-51991

(51) Int. Cl.
*H04M 1/00* (2006.01)

(52) U.S. Cl. ................ 455/575.6; 455/575.1; 455/90.3; 455/569.1; 224/667; 224/669; 224/269; 24/3.1; 24/3.9

(58) Field of Classification Search .. 455/568.1–568.7, 455/569, 515.1, 90.1, 95, 346–348, 351, 455/575.1, 575, 90.3, 569.1; 224/269, 249, 224/665–670, 197, 930, 11; 24/3.1, 507–509, 24/500, 3.7–3.9; 411/81, 191, 314, 366, 411/369; 248/188.8, 188.9, 188; 220/630, 220/636; 403/259, 324
See application file for complete search history.

(56) References Cited

U.S. PATENT DOCUMENTS

| | | | | |
|---|---|---|---|---|
| 4,635,836 A * | 1/1987 | Mooney et al. | ............. | 224/247 |
| 5,016,326 A * | 5/1991 | Goldenberg | ................. | 24/3.11 |
| 5,426,825 A * | 6/1995 | Soren et al. | ................. | 24/3.12 |
| 5,850,954 A * | 12/1998 | Dong-Joo | ................... | 224/197 |
| 6,032,337 A * | 3/2000 | Rankin et al. | ............... | 24/3.12 |
| 6,283,348 B1 * | 9/2001 | Wang | ......................... | 224/271 |
| 6,377,444 B1 * | 4/2002 | Price et al. | ................. | 361/683 |
| 6,384,810 B1 * | 5/2002 | Selker | ........................ | 345/168 |
| 6,397,046 B1 * | 5/2002 | Kfoury | ..................... | 455/90.1 |
| 6,430,400 B1 * | 8/2002 | MacDonald et al. | ....... | 455/90.1 |
| 6,434,403 B1 * | 8/2002 | Ausems et al. | .......... | 455/556.2 |
| 6,470,535 B1 * | 10/2002 | Mayne et al. | ................ | 24/3.12 |

FOREIGN PATENT DOCUMENTS

DE   298 13 462 U1 * 10/1998

* cited by examiner

*Primary Examiner*—Edan Orgad
(74) *Attorney, Agent, or Firm*—Fleshner & Kim LLP (57) ABSTRACT

A belt clip device is provided for a mobile communication terminal unit. The belt clip device includes a terminal unit holder for receiving and holding the terminal unit, a clamp provided on one side of the terminal unit holder and adapted to resiliently clip a belt worn by a user, thereby allowing the belt clip device to be mounted to the belt, and a connector for rotatably connecting the clamp to the terminal unit holder. The clamp includes a base portion, a panel portion hingably coupled at one end thereof to the base portion and spaced apart from the base portion to define a gap for receiving the belt therebetween, a spring adapted to urge the base portion and the panel portion in such a fashion that the gap is resiliently maintained, and a stopper provided at the other end of the panel portion and adapted to prevent the clamp from being separated from the belt. The connector includes a hinging member hingably coupled to the base portion of the clamp to hinge about a hinge shaft with respect to the clamp, and a rotating shaft for rotatably coupling the terminal unit holder to the hinging member in such a fashion that the terminal unit holder rotates about the rotating shaft with respect to the hinging member. By this configuration, the user can conveniently view a display window of the terminal unit without separating the terminal unit from the terminal unit holder.

30 Claims, 9 Drawing Sheets

BELT CLIP DEVICE FOR MOBILE COMMUNICATION TERMINAL UNIT

BACKGROUND OF THE INVENTION

1. Field of the Invention

The present invention relates to a belt clip device for a mobile communication terminal unit, and more particularly to a belt clip device for a mobile communication terminal unit capable of allowing the user to conveniently view the display window of the terminal unit even in a state wearing the terminal unit at his side.

2. Description of the Prior Art

Today, mobile communication systems has been rendered to be a necessity in the present society. This has resulted in an increased demand for terminal units of such mobile communication systems. Recently, terminal units having new functions have been developed in order to allow those terminal units to be more conveniently used. In particular, in mobile communication terminal units, the convenience in carrying those terminal units is considered to be important because they are always carried by user on their bodies.

Typically, a mobile communication terminal unit is provided with an LCD panel arranged at the front or top surface of a unit body. The mobile communication terminal unit may also be provided with a belt clip device in order to allow the user to easily and conveniently carry the terminal unit at his side. The belt clip device also has the function of protecting the terminal unit.

Figure 1:
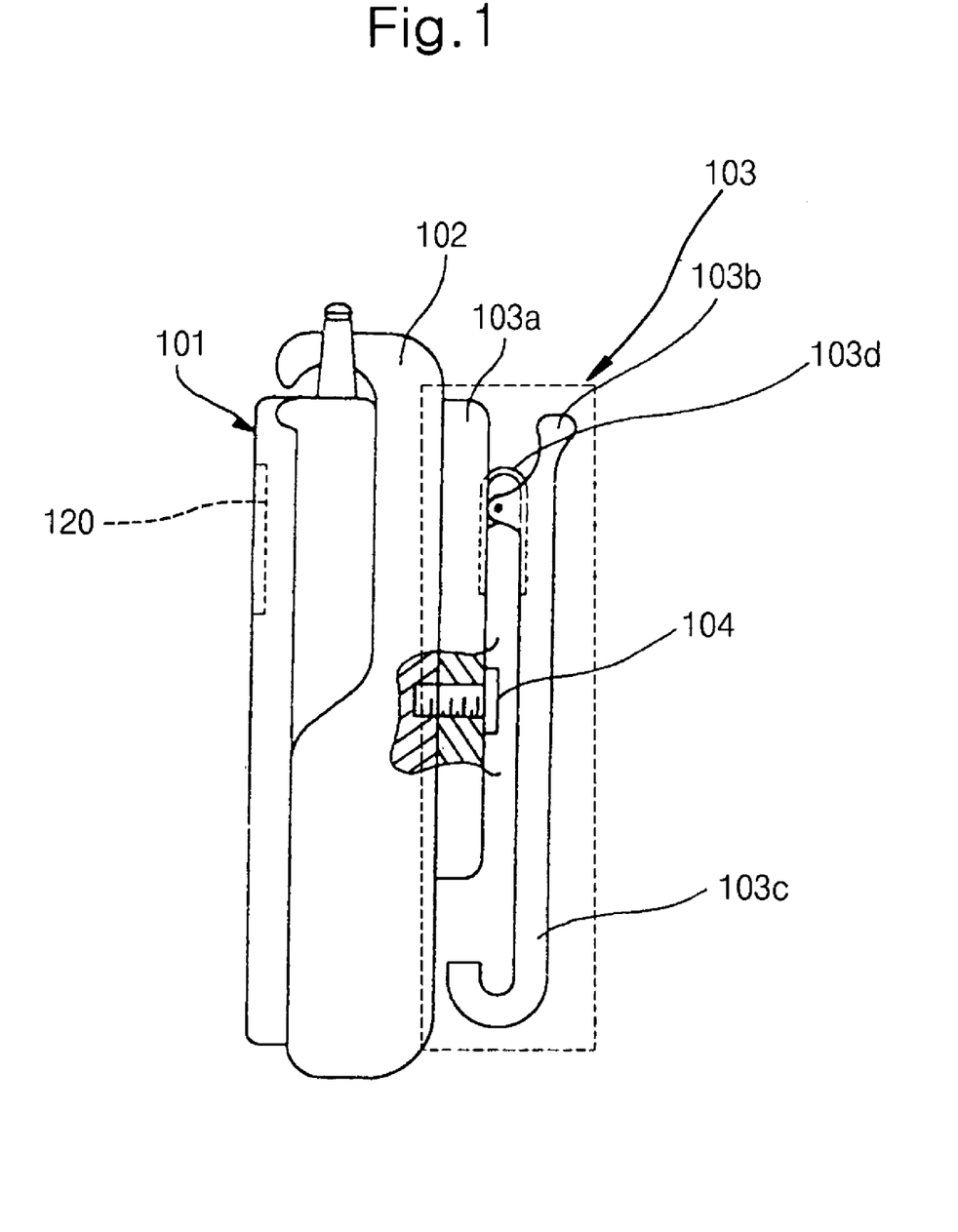
FIG. 1 is a side view illustrating a conventional belt clip device for a mobile communication terminal unit.

FIG. 1 is a side view illustrating a conventional belt clip device for a mobile communication terminal unit.

Referring to FIG. 1, the conventional belt clip device mainly includes a terminal unit holder 102 for receiving and holding a terminal unit 101, and a clamp 103 attached to the terminal unit holder 102 at one side of the terminal unit holder 102 and adapted to allow the belt clip device to be mounted to a belt. The clamp 103 has a base portion 103a coupled to the rear surface of the terminal unit holder 102 by means of set screws 104, and a panel portion 103c hingably coupled to the base portion 103a and spaced apart from the base 103a by a desired gap by virtue of a plate spring 103d.

Where the user desires to carry the terminal unit at his side using the above mentioned conventional belt clip device, he depresses a depressing portion 103b of the clamp 103 against the spring force of the plate spring 103d to sufficiently space the panel portion 103c of the clamp 103 apart from the base portion 103a, thereby forming a sufficient gap therebetween, and then couples the belt clip device to his belt in such a fashion that the belt is fitted into the gap. Since the base portion 103a and panel portion 103c of the clamp 103 are urged toward each other by the plate spring 103d arranged therebetween, they come into tight contact with the belt in a pressed state, thereby causing the belt clip device to be firmly held on the belt. Accordingly, the user can carry the mobile communication terminal unit 101 in a state in which it is received and held in the terminal unit holder 102.

Meanwhile, it may be often required for the user to view an LCD panel 102, that is, an information display window, of the terminal unit 101 in a state, in which he carries the terminal unit 101 using the belt clip device, in order to confirm the telephone number of a calling party in response to a call from the calling party, a message received from the calling party, or the current time. In this case, however, the user can view only an inclined or inverted image of the information or content displayed on the LCD panel 102. As a result, it is difficult for the user to accurately confirm the displayed information or content. In order to accurately confirm the displayed information or content, there is an inconvenience in that the user must view it after separating the terminal unit 101 from the terminal unit holder 102.

SUMMARY OF THE INVENTION

Therefore, the present invention has been made in view of the above mentioned problems, and an object of the invention is to provide a belt clip device for a mobile communication terminal unit which includes a terminal unit holder and a clamp hingably connected together, thereby allowing the user to rapidly and accurately view the display window of the terminal unit in a state carrying the terminal unit at his side.

In order to accomplish this object, the present invention provides a belt clip device for a mobile communication terminal unit comprising: a terminal unit holder for receiving and holding the terminal unit; a clamp provided at the terminal unit holder at one side of the terminal unit holder and adapted to resiliently clip a belt worn by a user, thereby allowing the belt clip device to be mounted to the belt; and connecting means for rotatably connecting the clamp to the terminal unit holder.

Preferably, the clamp comprises a base portion, a panel portion hingably coupled at one end thereof to the base portion and spaced apart from the base portion to define a gap for receiving the belt therebetween, a spring adapted to urge the base portion and the panel portion in such a fashion that the gap is resiliently maintained, and a stopper provided at the other end of the panel portion and adapted to prevent the clamp from being separated from the belt.

Alternatively, the clamp may comprise a base portion, a tension panel portion connected at one end thereof to the base portion in such a fashion that it is resiliently supported by the base portion, the tension panel portion serving to resiliently clip the belt, and a stopper provided at the other end of the tension panel portion and adapted to prevent the clamp from being separated from the belt.

Preferably, the connecting means comprises a hinging member arranged between the terminal unit adapter and the clamp, the hinging member being hingably coupled to the base portion of the clamp in such a fashion that it hinges about a hinge shaft with respect to the clamp while being rotatably coupled to the terminal unit holder, and a rotating shaft for rotatably coupling the terminal unit holder to the hinging member in such a fashion that the terminal unit holder rotates about the rotating shaft with respect to the hinging member.

The belt clip device may further comprise angular position holding means for holding an angular position of the terminal unit holder with respect to the hinging member.

Preferably, the rotating position holding means comprises a hole formed at a surface of the terminal unit holder facing the clamp, a spring-loaded ball received in the hole in such a fashion that it is in contact with a surface of the hinging member contacting the surface of the terminal unit holder in a state urged against the surface of the hinging member, and a plurality of engagement grooves formed at the surface of the hinging member and adapted to in order to allow the spring-loaded ball to be resiliently held at a desired position along a rotating circumference of the spring-loaded ball, whereby the terminal unit holder is resiliently held at an angular position corresponding to a position of the spring-loaded ball received in a selected one of the engagement grooves.

Alternatively, the connecting means may comprise a cylindrical rotating shaft holding member provided at one end of the clamp, a spring received in the rotating shaft holding member, a pair of rotating shaft supporting members formed at the terminal unit holder, each of the rotating shaft supporting members being provided with a plurality of radially extending engagement grooves at an inner surface thereof, and a pair of rotating shafts respectively adapted to rotatably couple the rotating shaft holding member to the rotating shaft supporting members and fitted in the rotating shaft holding member at opposite sides of the spring received in the rotating shaft holding member in such a fashion that they are axially slidable while being prevented from rotating with respect to the rotating shaft holding member, each of the rotating shafts being engaged with a selected one of the engagement grooves formed at an associated one of the rotating shaft supporting members.

Preferably, each of the rotating shaft supporting members has a recessed structure for receiving and holding one end of an associated one of the rotating shafts, the rotating shaft end being protruded from the rotating shaft holding member. In this case, each of the rotating shafts is provided at the one end thereof with an engagement protrusion adapted to engage with a selected one of the engagement grooves formed at an associated one of the rotating shaft supporting members, thereby causing the terminal unit holder to be held at a position defined by the engagement groove engaged with the engagement protrusion with respect to the clamp.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Now, preferred embodiments of the present invention will be described in conjunction with the annexed drawings.

Referring to FIGS. 2 to 5, a belt clip device for a mobile communication terminal unit according to an embodiment of the present invention is illustrated, respectively. As shown in FIGS. 2 to 5, the belt clip device includes a terminal unit holder 202 for receiving and holding a terminal unit 201, a clamp 203 connected to the terminal unit holder 202 at one side of the terminal unit holder 202 and adapted to allow the belt clip device to be mounted to a belt, and a connecting means for rotatably connecting the clamp 203 to the terminal unit holder 202.

The clamp 203 has a panel-shaped base portion 203a, and a panel portion 203c hingably coupled at the upper end thereof to the base portion 203a. The panel portion 203c is provided at the upper end thereof with a depressing portion 203b and at the lower end thereof with a stopper. The depressing portion 203b and stopper are integral with the panel portion 203c. A pair of grooves 203d and 203e are formed at respective surfaces of the base 203a and panel portion 203c facing each other. The clamp 203 also includes a plate spring 203f fitted in the grooves 203d and 203e at both ends thereof, respectively. The plate spring 203f serves to space the base 203 and 203c apart from each other by a desired gap.

The connecting means includes a hinging member 207 rotatably coupled to the rear surface of the terminal unit holder 202 and hingably coupled to the base portion 203a of the clamp 203. The hinging member 207 has a pair of inclined portions 207a spaced apart from each other and hingably coupled to opposite side surfaces of the base portion 203a of the clamp 203 by means of a hinge shaft 206, respectively, in order to allow the hinging member 207 to hinge about the hinge shaft 206 with respect to the clamp 203. The hinging member 207 is also provided at its central portion with a through hole 204. The connecting means also includes a rotating shaft 208 fitted in the through hole 204 of the hinging member 207 in order to allow the terminal unit holder 202 to rotate about the rotating shaft 208 by a desired angle with respect to the hinging member 207. A hole 209 is formed at the rear surface of the terminal unit holder 202 to receive a spring-loaded ball 210 therein. The spring-loaded ball 210 is in contact with the surface of the hinging member 207 facing the rear surface of the terminal unit holder 202 in a state urged against that surface by its spring. At the ball contacting surface of the hinging member 207, first through fourth engagement grooves 211 to 214 uniformly spaced apart from one another are formed in order to allow the spring-loaded ball 210 to be resiliently held at a desired position along a rotating circumference of the spring-loaded ball 210. By virtue of this configuration, the terminal unit holder 202 is resiliently held at an angular position corresponding to the position of the ball 210 received in a selected one of the grooves 211 to 214. In the illustrated case, the engagement grooves 211 to 214 are spaced apart from one another by an angle of 90 so that they define four 90-spaced angular positions for the terminal unit holder 202, respectively.

Figure 2:
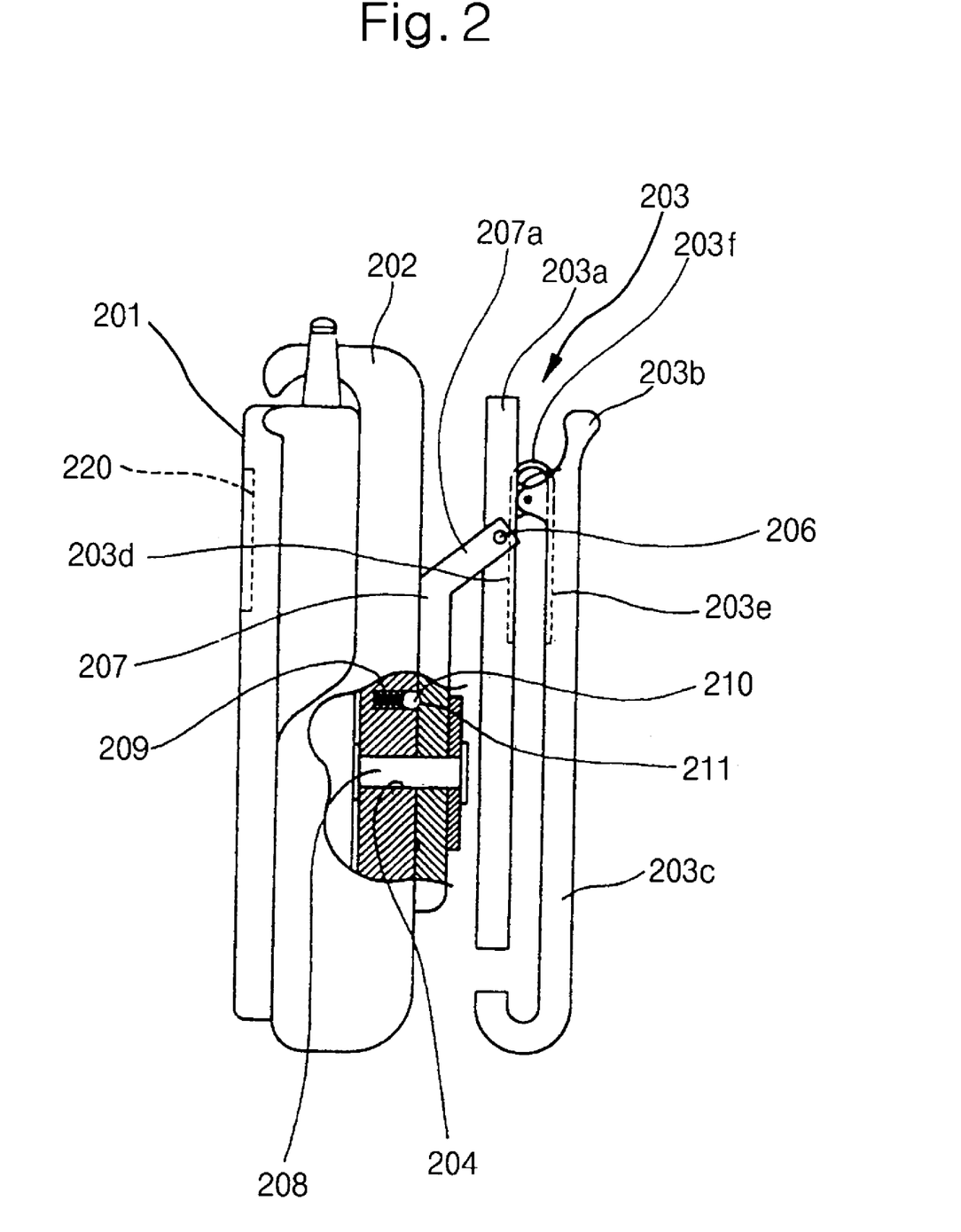
FIG. 2 is a side view illustrating a belt clip device for a mobile communication terminal unit in accordance with an embodiment of the present invention.
Figure 3:
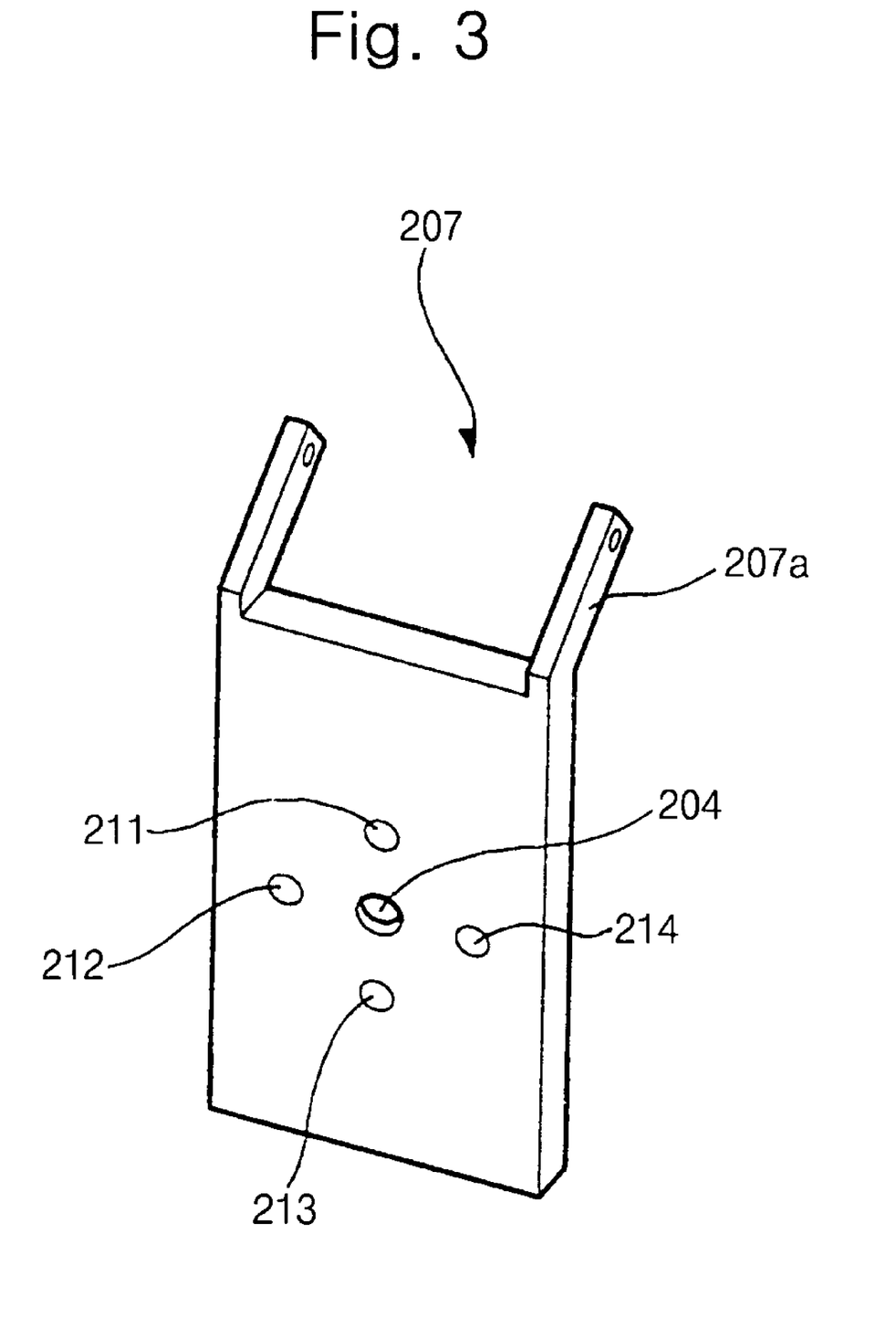
FIG. 3 is a perspective view illustrating a hinging member included in the belt clip device of FIG. 2.

Now, the operation of the belt clip device having the above mentioned configuration according to the illustrated embodiment of the present invention will be described. Where the user desires to carry, at his side, the terminal unit 201 held in the terminal unit holder 202, he depresses the depressing portion 203b of the clamp 203 against the spring force of the plate spring 203f to sufficiently space the panel portion 203c of the clamp 203 apart from the base portion 203a, thereby forming a sufficient gap therebetween, and then couples the belt clip device to his belt in such a fashion that the belt is fitted into the gap. Since the base portion 203a and panel portion 203c of the clamp 203 are urged toward each other by the plate spring 203f arranged therebetween, they come into tight contact with the belt in a pressed state, thereby causing the belt clip device to be firmly held on the belt. Accordingly, the user can carry the mobile communication terminal unit 201 in a state in which it is received and held in the terminal unit holder 202.

Figure 4:
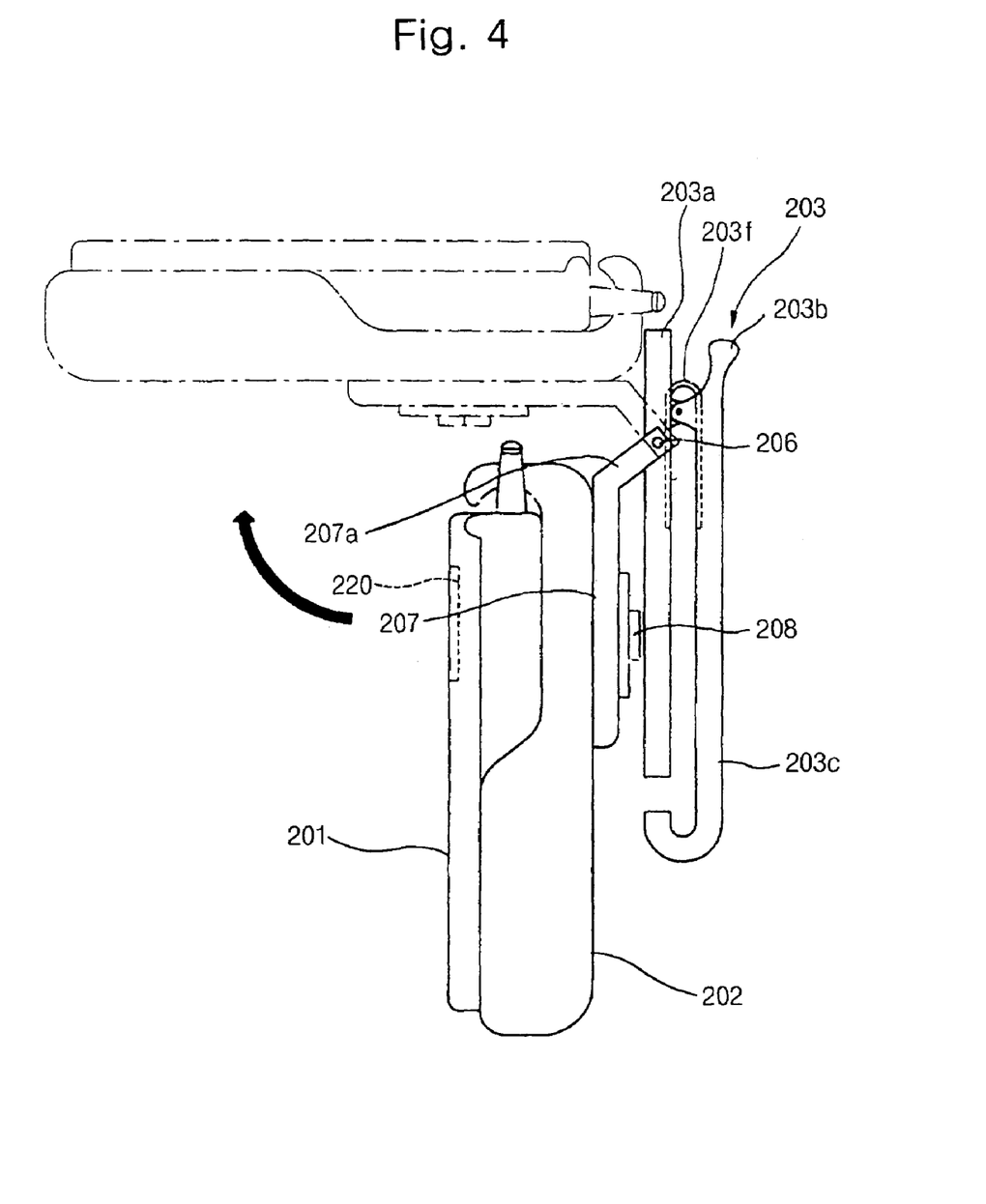
FIG. 4 is a side view illustrating an upwardly hinged state of the hinging member in the belt clip device of FIG. 2.

Meanwhile, when the user desires to view an LCD panel 220 of the terminal unit 201 in a state, in which he carries the terminal unit 201 held in the terminal unit holder 202, in order to confirm the information or content displayed on the LCD panel 220, he upwardly hinges the terminal unit holder 202 about the hinge shaft 206 with respect to the base portion 203a of the clamp 203 while gripping the terminal unit holder 202, until the terminal unit 201 is horizontally positioned. In this state, the user can downwardly view the LCD panel 220, so that he can easily and accurately confirm the displayed information or content.

Figure 5:
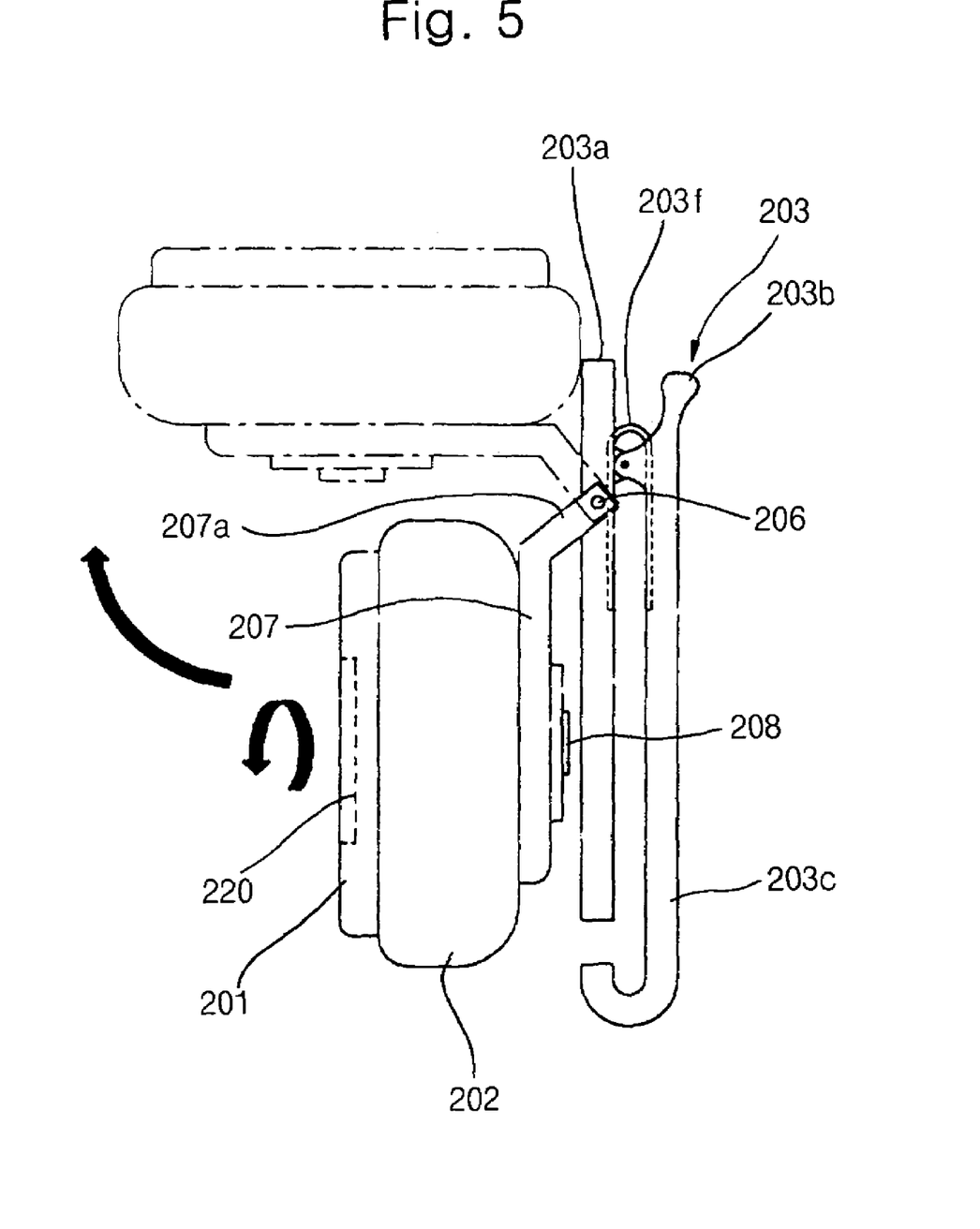
FIG. 5 is a side view illustrating a rotated state of a terminal unit holder included in the belt clip device of FIG. 2.

If the image of the information or content displayed on the LCD panel 102 is viewed in a laterally-rotated or inverted state, the user then rotates the terminal unit holder 202 about the rotating shaft 208 with respect to the hinging member 207 so as to view that image in a normal state. As the user rotates the terminal unit holder 202 in one direction, the spring-loaded ball 210, which has been in a state resiliently engaged with the first engagement groove 211, is separated from the first engagement groove 211, and then resiliently engaged with an associated one of the second and fourth engagement grooves 212 and 214, thereby causing the terminal unit holder 202 to be positioned at a position rotated 90 from the initial position thereof where it is longitudinally aligned with the hinging member 207. As the terminal unit holder 202 is further rotated in the same direction as mentioned above, the spring-loaded ball 210 is separated from the second or fourth engagement groove 212 or 214, and then resiliently engaged with the third engagement grooves 213, thereby causing the terminal unit holder 202 to be positioned at a position rotated 180 from the initial position thereof. Thus, the user can more accurately and conveniently view the information or content displayed on the LCD panel 200 in the rotated position of the terminal unit 201 corresponding to the second, third or, fourth engagement groove 212, 213, or 214 in a state in which an unintentional rotation of the terminal unit holder 202 from the rotated position is prevented by virtue of the engagement between the spring-loaded ball 210 and the associated engagement groove.

In accordance with the illustrated embodiment, the user can rapidly and accurately confirm the information or content displayed on the LCD panel 220 in a state held by the terminal unit holder 202 in that he can view the displayed information or content at a convenient position defined by hinging the hinging member 207 operatively connected to the terminal unit holder 202 by a desired angle, and, if necessary, rotating the terminal unit holder 202 about the rotating shaft 208 with respect to the hinging member 207 by a desired angle.

Referring to FIGS. 6 to 9, a belt clip device for a mobile communication terminal unit according to another embodiment of the present invention is illustrated, respectively.

As shown in FIGS. 6 to 9, the belt clip device includes a terminal unit holder 301 for receiving and holding the terminal unit 201, a clamp 500 connected to the terminal unit holder 301 at one side of the terminal unit holder 301 and adapted to allow the belt clip device to be mounted to a belt, and a connecting means for rotatably connecting the clamp 500 to the terminal unit holder 301.

Figure 6:
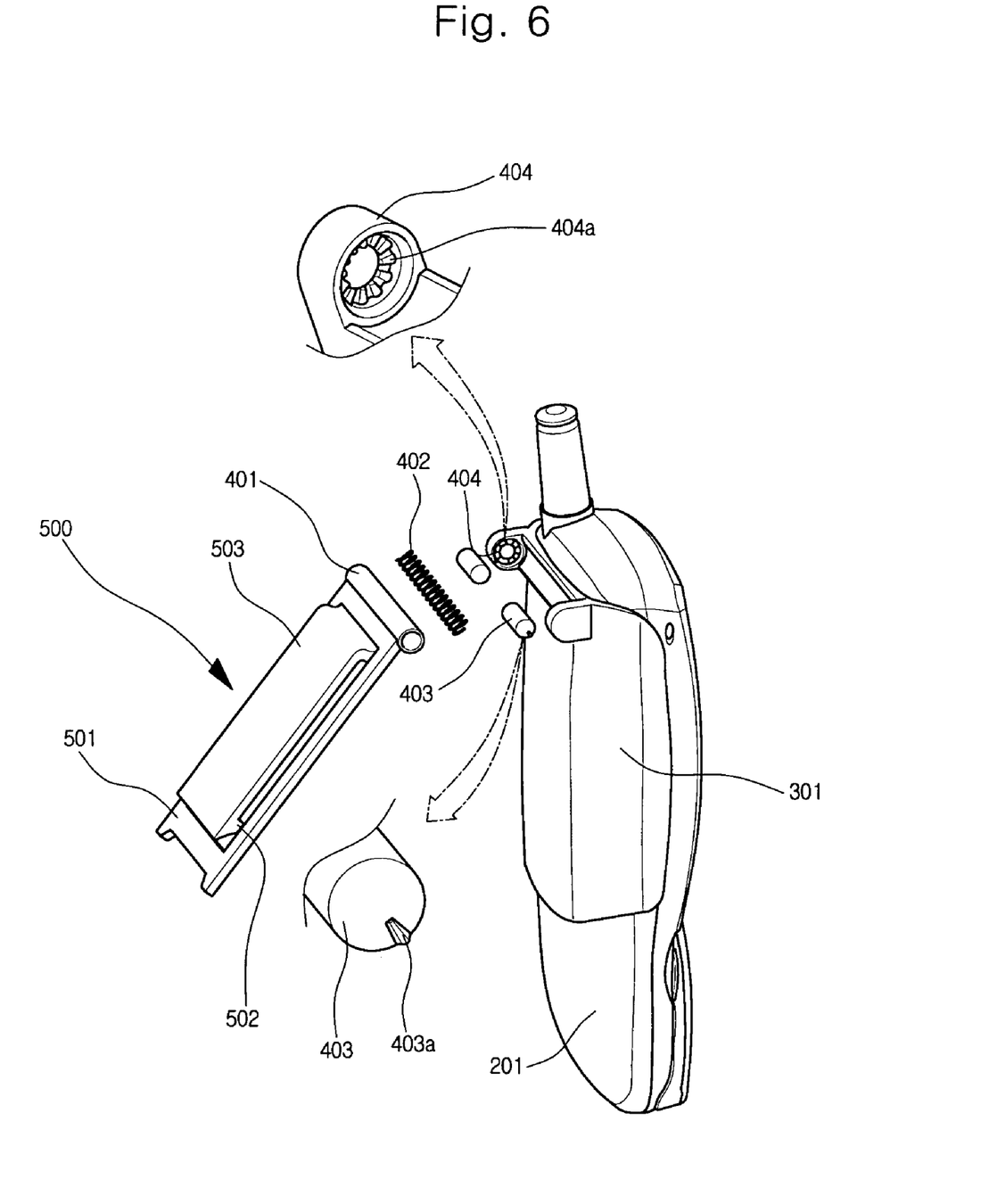
FIG. 6 is an exploded perspective view illustrating a belt clip device for a mobile communication terminal unit in accordance with another embodiment of the present invention.

The clamp 500 has a panel-shaped base portion 501, and a tension panel portion 503 integrally formed with the base portion 501. The tension panel portion 503 is connected at one end thereof to the base portion 501 in such a fashion that it is resiliently supported by the base portion 501. The tension panel portion 503 is also provided with a wedge-shaped stopper 502 in the vicinity of the other end thereof. The base portion 501 has an opening through which the wedge-shaped stopper is slightly protruded toward the terminal unit holder 301. By virtue of the wedge-shaped stopper 502, the tension panel portion 503 of the clamp 500 serves to clip the belt, thereby allowing the belt clip device to be separably mounted to the belt.

The connecting means includes a cylindrical rotating shaft holding member 401 provided at one end of the clamp 500 in such a fashion that it is integral with the clamp 500, a compression coil spring 402 received in the rotating shaft holding member 401, and a pair of spaced rotating shafts 403 fitted in the rotating shaft holding member 401 at opposite sides of the compression coil spring 402 received in the rotating shaft holding member 401 in such a fashion that they are axially slidable while being prevented from rotating with respect to the rotating shaft holding member 401. Each rotating shaft 403 is provided at its outer end with an engagement protrusion 403a. The connecting means also includes a pair of spaced rotating shaft supporting members 404 formed at a desired portion, for example, an upper end, of the terminal unit holder 301. Each rotating shaft supporting member 404 has a recessed structure for receiving the outer end of an associated one of the rotating shafts 403. The rotating shaft supporting member 404 is provided with a plurality of radially extending engagement grooves 404a at the inner bottom surface thereof. The engagement protrusion 403a of each rotating shaft 403 is resiliently engaged with one of the engagement grooves 404a of an associated one of the rotating shaft supporting members 404, thereby causing the terminal unit holder 301 to be held at a position defined by the engagement groove 404a engaged with the engagement protrusion 403a with respect to the clamp 500.

The operation of the belt clip device having the above mentioned configuration according to the second embodiment of the present invention will be described.

Since the tension panel portion 503 of the clamp 500 has the wedge-shaped stopper 502, a slight gap is defined between the base portion 501 and tension panel portion 503 of the clamp 500 at the stopper-arranged portion of the clamp 500 in order to allow an insertion of the belt therebetween. Once the belt is forcedly inserted into the gap of the clamp 500 in such a fashion that the clamp 500 clips the belt, the clamp 500 is firmly held by the belt by virtue of a tension generated by the tension panel portion 503. In particular, the clamp 500 is prevented from being easily separated from the belt by virtue of the wedge-shaped stopper 502.

Meanwhile, the engagement protrusion 403a of each rotating shaft 403 is in a state resiliently engaged with one of the engagement grooves 404a of an associated one of the rotating shaft supporting member 404 by virtue of the compression coil spring 402, so that the terminal unit holder 301 is held at a position defined by the engagement groove 404a engaged with the engagement protrusion 403a with respect to the clamp 500. When an external rotating force exceeding the spring force of the compression coil spring 402 is applied to the terminal unit holder 301, each rotating shaft supporting member 404 is rotated about an associated one of the rotating shafts 403 with respect to the clamp 500 in such a fashion that the engagement protrusion 403a of the rotating shaft 403 slides circumferentially along the engagement grooves 404a of the rotating shaft supporting member 404. When the external rotating force applied to the terminal unit holder 301 is released, the terminal unit holder 301 is held at a position defined by one of the engagement groove 404*a* engaged with the engagement protrusion 403*a*. Thus, it is possible to hold the terminal unit holder 301 at a position rotated by an optional angle with respect to the clamp 500.

Figure 7:
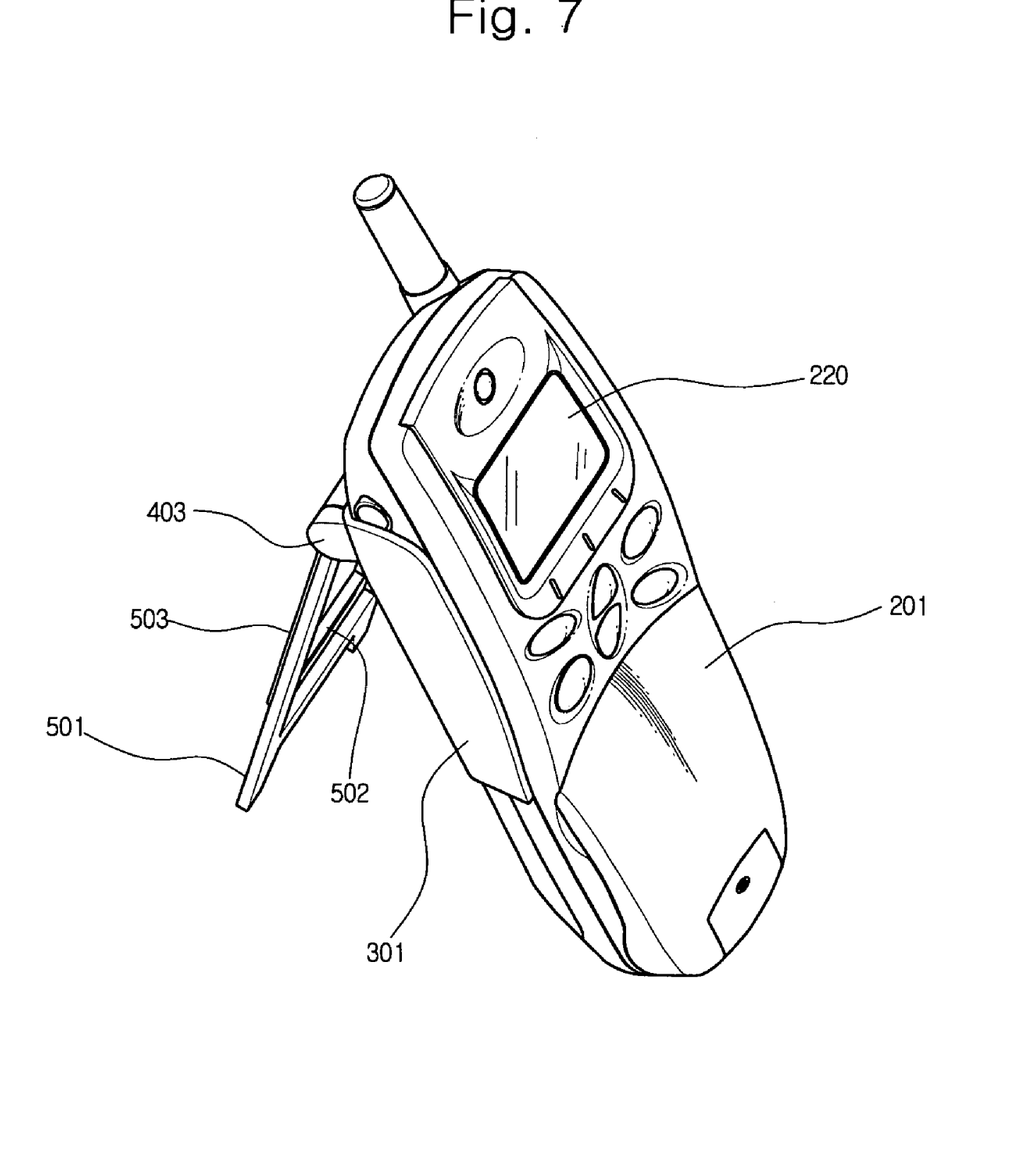
FIG. 7 is a front perspective view illustrating a using condition of the belt clip device of FIG. 6.

Since the terminal unit holder 301 can be held at an optional angular position with respect to the clamp 500, there is also an advantage in that the terminal unit 201 can be maintained in an upright status on a table in order to allow the user to conveniently view the LCD panel 220 of the terminal unit 201, as shown in FIG. 7.

Figure 8:
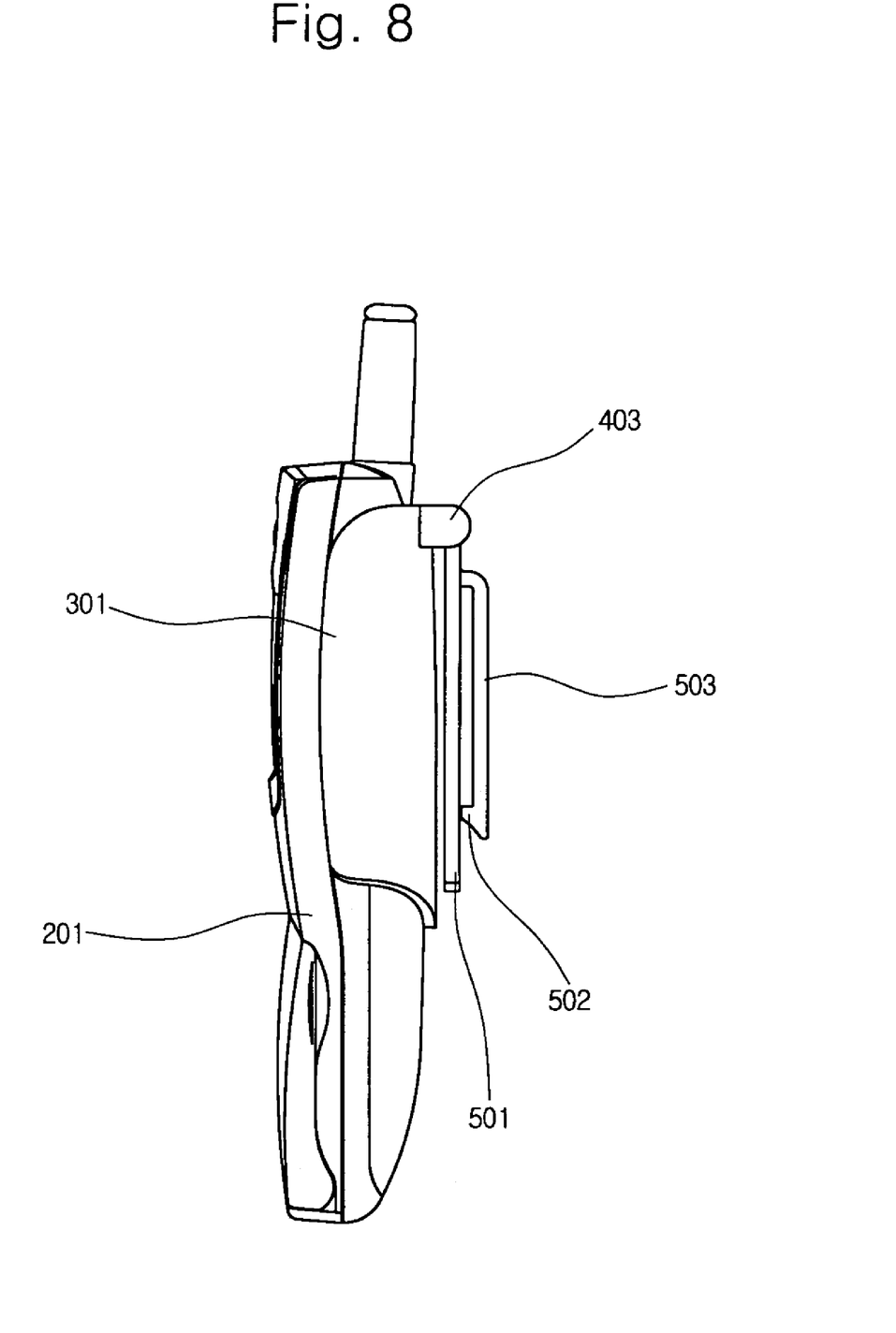
FIG. 8 is a side view illustrating a state of the belt clip device of FIG. 6, carried by a belt, in which a terminal unit holder and a clamp are in a state folded with respect to each other.
Figure 9:
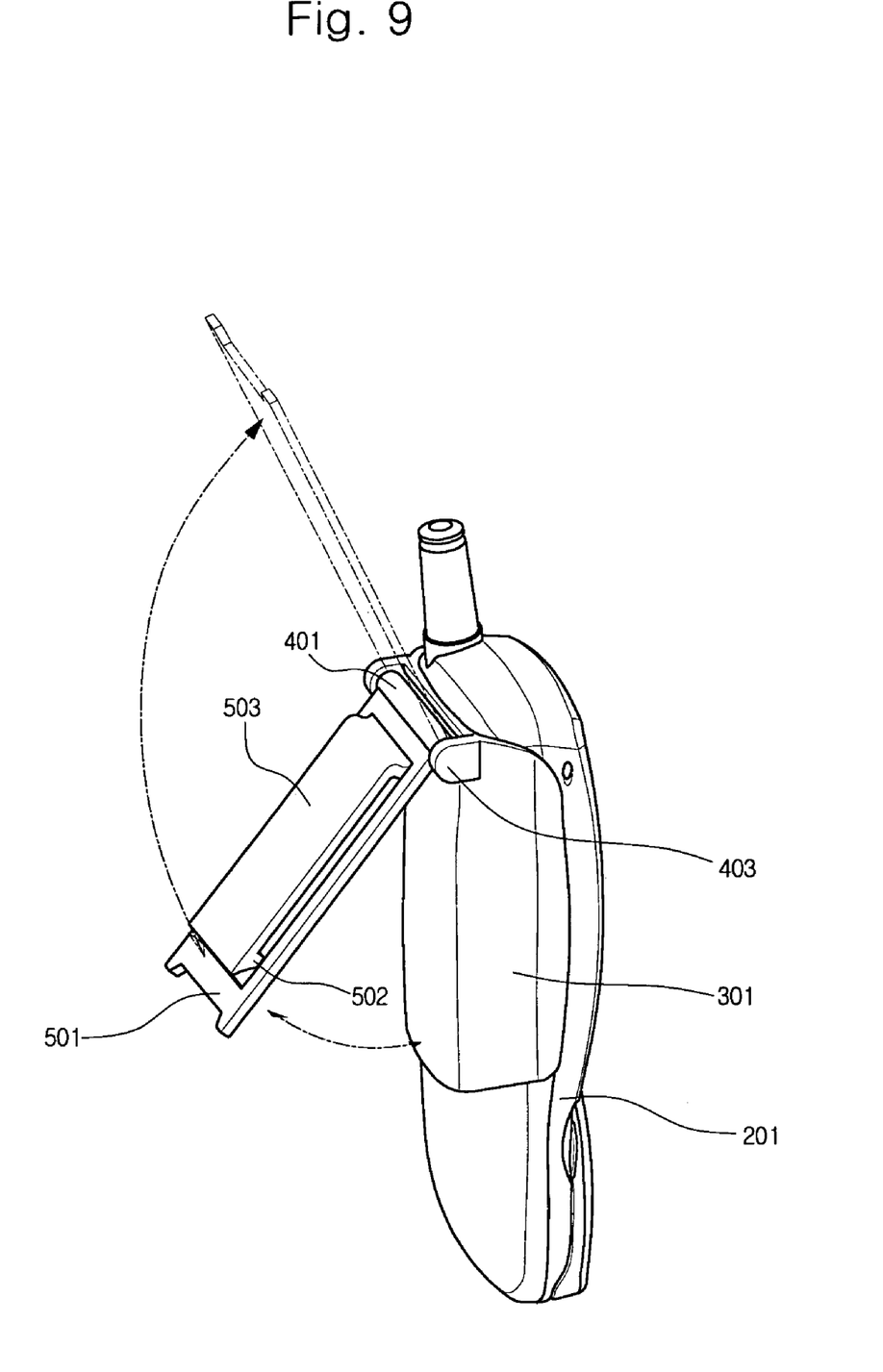
FIG. 9 is a rear perspective view illustrating a using condition of the belt clip device of FIG. 6.

In a state in which the terminal unit 201 is carried by the belt of the user, the belt clip device is maintained in such a fashion that the terminal unit holder 301 and clamp 500 are in a state folded with respect to each other, in order to allow the user to conveniently carry the terminal unit 201. When the user desires to view the LCD panel 220 of the terminal unit 201 in a state, in which he carries the terminal unit 201 held in the terminal unit holder 202, in order to confirm the information or content displayed on the LCD panel 220, he adjusts the angle of the terminal unit holder 301 with respect to the clamp 500, as shown in FIG. 9 by upwardly rotating the terminal unit holder 202 about the rotating shafts 403. Accordingly, the user can view the LCD panel 220 without separating the terminal unit 201 from the terminal unit holder 301 to confirm the information or content displayed on the LCD panel 220.

As apparent from the above description, the present invention provides a belt clip device for a mobile communication terminal unit including a terminal unit holder and a clamp hingably or rotatably connected together in such a fashion that they are hinged or rotated between a folded state allowing the user to conveniently carry the terminal unit by a belt and a developed state allowing the user to conveniently view a display window of the terminal unit without separating the terminal unit from the terminal unit holder.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A belt clip device for a mobile communication terminal unit comprising:
   a terminal unit holder for receiving and holding the terminal unit;
   a clamp provided on one side of the terminal unit holder and adapted to resiliently clip a belt worn by a user between first and second clamp arms of the clamp, thereby allowing the belt clip device to be mounted to the belt; and
   a connector to rotatably connect the clamp to the terminal unit holder such that the terminal unit holder is rotatable in a plane extending substantially perpendicular to a front surface of the clamp, wherein a first end of the second clamp arm moves in a first direction relative to the first clamp arm when a force is applied in a second opposing direction to a depressing portion located on a second end of the second clamp arm said force increasing a distance between the first and second clamp arms.

2. The belt clip device according to claim 1, wherein the first clamp arm comprises a base portion and the second clamp arm comprises a panel portion hingably coupled at one end thereof to the base portion and spaced apart from the base portion to define a gap for receiving the belt therebetween, and wherein the clamp further comprises a spring adapted to urge the base portion and the panel portion in such a fashion that the gap is resiliently maintained.

3. The belt clip device according to claim 2, wherein the clamp further comprises a stopper provided at the other end of the panel portion and adapted to prevent the clamp from being separated from the belt.

4. The belt clip device according to claim 1, wherein the connector comprises:
   a hinging member arranged between the terminal unit adapter and the clamp, the hinging member being hingably coupled to the first clamp arm of the clamp in such a fashion that it hinges about a hinge shaft with respect to the clamp while being rotatably coupled to the terminal unit holder; and
   a rotating shaft for rotatably coupling the terminal unit holder to the hinging member in such a fashion that the terminal unit holder rotates about the rotating shaft with respect to the hinging member.

5. The belt clip device according to claim 4, further comprising: angular position holding means for holding an angular position of the terminal unit holder with respect to the hinging member.

6. The belt clip device according to claim 5, wherein the angular position holding means comprises:
   a hole formed in a surface of the terminal unit holder facing the clamp;
   a spring-loaded ball received in the hole in such a fashion that it is in contact with a surface of the hinging member contacting the surface of the terminal unit holder so as to be urged against the surface of the hinging member; and
   a plurality of engagement grooves formed in the surface of the hinging member and adapted to allow the spring-loaded ball to be resiliently held at a desired position along a rotating circumference of the spring-loaded ball, whereby the terminal unit holder is resiliently held at an angular position corresponding to a position of the spring-loaded ball received in a selected one of the engagement grooves.

7. The belt clip of claim 1, wherein the first and second directions are parallel to the plane extending substantially perpendicular to the front surface of the clamp.

8. The belt clip of claim 1, wherein the clamp further comprises:
   a spring member adapted to bias the second clamp arm towards the first clamp arm to hold the belt therebetween when said force is released from the depressing portion.

9. The belt clip of claim 1, further comprising:
   a stopper located on the first end of the second clamp arm to prevent the clamp from being separated from the belt.

10. The belt clip of claim 9, wherein the stopper includes a hook-shaped portion.

11. The belt clip of claim 10, wherein a terminating end of the hook-shaped portion is substantially even with a surface of the first clamp arm.

12. A belt clip device for a mobile communication terminal unit, comprising:
   a terminal unit holder for receiving and holding the terminal unit;
   a clamp provided on one side of the terminal unit holder and adapted to resiliently clip a belt worn by a user between first and second clamp arms of the clamp, thereby allowing the belt clip device to be mounted to the belt; and a connector to rotatably connect the clamp to the terminal unit holder such that the terminal unit holder is rotatable in a plane extending substantially perpendicular to a front surface of the clamp, wherein the first clamp arm comprises a base portion and the second clamp arm comprises a tension panel portion connected at one end thereof to the base portion in such a fashion that tension panel portion is resiliently supported by the base portion, the tension panel portion serving to resiliently clip the belt, and wherein the clamp further comprises a stopper provided at another end of the tension panel portion and adapted to prevent the clamp from being separated from the belt.

13. A belt clip device for a mobile communication terminal unit, comprising:

a terminal unit holder for receiving and holding the terminal unit;

a clamp provided on one side of the terminal unit holder and adapted to resiliently clip a belt worn by a user between first and second clamp arms of the clamp, thereby allowing the belt clip device to be mounted to the belt; and a connector to rotatably connect the clamp to the terminal unit holder such that the terminal unit holder is rotatable in a plane extending substantially perpendicular to a front surface of the clamp, wherein the connector comprises:

a cylindrical rotating shaft holding member provided at one end of the clamp;

a spring inserted in the rotating shaft holding member;

a pair of rotating shaft supporting members formed on the terminal unit holder, each of the rotating shaft supporting members being provided with a plurality of radially extending engagement grooves in an inner surface thereof; and a pair of rotating shafts respectively adapted to rotatably couple the rotating shaft holding member to the rotating shaft supporting members and fitted in the rotating shaft holding member at opposite sides of the spring inserted in the rotating shaft holding member in such a fashion that they are axially slidable while being prevented from rotating with respect to the rotating shaft holding member, each of the rotating shafts being engaged with a selected one of the engagement grooves formed in an associated one of the rotating shaft supporting members.

14. The belt clip device according to claim 13, wherein each of the rotating shaft supporting members has a recessed structure for receiving and holding one end of an associated one of the rotating shafts, the rotating shaft end being protruded from the rotating shaft holding member, and each of the rotating shafts is provided with an engagement protrusion at one end thereof adapted to engage with a selected one of the engagement grooves formed in an associated one of the rotating shaft supporting members, thereby causing the terminal unit holder to be held at a position with respect to the clamp by the respective engagement groove engaged with the respective engagement protrusion.

15. A belt clip device for a mobile communication terminal unit comprising:

a terminal unit holder configured to hold a terminal unit;

a clamp provided adjacent to the terminal unit holder and configured to resiliently clip a belt worn by a user, between first and second clamp arms of the clamp; and a connecting device configured to rotatably connect the clamp to the terminal unit holder such that the terminal unit holder is rotatable in a plane extending substantially perpendicular to a front surface of the clamp, wherein the first clamp arm comprises a base portion and the second clamp arm comprises a panel portion coupled at one end to the base portion, and wherein the clamp further comprises a spring member disposed between the first and second claim arms to urge the base portion and the panel portion towards one another so as to hold a belt therebetween.

16. The belt clip device according to claim 15, wherein the clamp further comprises a stopper provided at the other end of the panel portion and configured to prevent the clamp from being separated from the belt.

17. The belt clip device according to claim 15, wherein the connecting device comprises:

a hinging member arranged between the terminal unit adapter and the clamp, the hinging member being configured to be hingably coupled to the first clamp arm of the clamp such that it is rotatable with respect to the clamp about a hinge shaft while being coupled to the terminal unit holder.

18. The belt clip device according to claim 17, wherein the connecting device further comprises a rotating shaft for rotatably coupling the terminal unit holder to the hinging member such that the terminal unit holder rotates about the rotating shaft with respect to the hinging member.

19. The belt clip device according to claim 18, further comprising: an angular position holding device configured to hold an angular position of the terminal unit holder with respect to the hinging member.

20. The belt clip device according to claim 19, wherein the angular position holding device comprises:

a hole formed in a surface of the terminal unit holder facing the clamp;

a spring-loaded ball received in the hole such that it contacts with and is urged against a surface of the hinging member; and a plurality of engagement grooves formed in the surface of the hinging member and configured to receive and hold the spring-loaded ball, whereby the terminal unit holder is resiliently held at an angular position corresponding to a position of the spring-loaded ball received in a selected one of the engagement grooves.

21. The belt clip device according to claim 15, wherein the connecting device comprises:

a cylindrical rotating shaft holding member provided at one end of the clamp;

a spring inserted in the rotating shaft holding member;

a pair of rotating shaft supporting members formed on the terminal unit holder, each of the rotating shaft supporting members being provided with a plurality of radially extending engagement grooves in an inner surface thereof; and a pair of rotating shafts respectively configured to rotatably couple the rotating shaft holding member to the rotating shaft supporting members and fitted in the rotating shaft holding member at opposite sides of the spring inserted in the rotating shaft holding member such that they are axially slidable while being prevented from rotating with respect to the rotating shaft holding member, each of the rotating shafts being engaged with a selected one of the engagement grooves formed in an associated one of the rotating shaft supporting members.

22. The belt clip device according to claim 21, wherein each of the rotating shaft supporting members has a recessed structure configured to receive and hold one end of an associated one of the rotating shafts, the rotating shaft end configured to protrude from the rotating shaft holding member, wherein each of the rotating shafts is provided with an engagement protrusion at one end thereof configured to engage with a selected one of the engagement grooves formed in an associated one of the rotating shaft supporting members, thereby causing the terminal unit holder to be held at a position with respect to the clamp.

23. A belt clip device for a mobile communication terminal unit, comprising:
   a terminal unit holder configured to hold a terminal unit;
   a clamp provided adjacent to the terminal unit holder and configured to resiliently clip a belt worn by a user, between first and second clamp arms of the clamp; and
   a connecting device configured to rotatably connect the clamp to the terminal unit holder such that the terminal unit holder is rotatable in a plane extending substantially perpendicular to a front surface of the clamp, wherein:
   the first clamp arm comprises a base portion and the second clamp arm comprises a tension panel portion connected at one end thereof to the base portion so as to be resiliently supported thereby, the tension panel portion serving to resiliently clip a belt, and
   the clamp further comprises a stopper provided at another end of the tension panel portion and adapted to prevent the clamp from being separated from a belt.

24. A belt clip device for a mobile communication terminal unit comprising:
   a terminal unit holder for receiving and holding the terminal unit;
   a clamp provided on one side of the terminal unit holder and adapted to resiliently clip a belt worn by a user between first and second clamp arms of the clamp, thereby allowing the belt clip device to be mounted to the belt;
   connecting means for rotatably connecting the clamp to the terminal unit holder, wherein the connecting means comprises:
      a hinging member arranged between the terminal unit adapter, and the clamp, the hinge member being hingeably coupled to the first clamp arm of the clamp in such a fashion that the hinges abut a hinge shaft with respect to the clamp while being rotatably coupled to the terminal unit holder; and
      a rotating shaft rotatably coupling the terminal unit holder to the hinging member in such a fashion that the terminal unit further rotates about the rotating shaft with respect to the hinge member; and
   angular position holding means for holding an angular position of the terminal holder with respect to the hinge member, wherein the angular position holding means comprises:
      a hole formed in a surface of the terminal unit holder facing the clamp;
      a spring-loaded ball received in the hole in such a fashion that it is in contact with a surface of the hinging member contacting the surface of the terminal unit holder so as to be urged against the surface of the hinging member; and
      a plurality of engagement grooves formed in the surface of the hinging member and adapted to allow the spring-loaded ball to be resiliently held at a desired position along a rotating circumference of the spring-loaded ball, whereby the terminal unit holder is resiliently held at an angular position corresponding to a position of the spring-loaded ball received in a selected one of the engagement grooves.

25. A belt clip device for a mobile communication terminal unit comprising:
   a terminal unit holder for receiving and holding the terminal unit;
   a clamp provided on one side of the terminal unit holder and adapted to resiliently clip a belt worn by a user between first and second clamp arms of the clamp, thereby allowing the belt clip device to be mounted to the belt; and
   connecting means for rotatably connecting the clamp to the terminal unit holder, wherein the connecting means comprises:
      a cylindrical rotating shaft holding member provided at one end of the clamp;
      a spring inserted in the rotating shaft holding member;
      a pair of rotating shaft supporting members formed on the terminal unit holder, each of the rotating shaft supporting members being provided with a plurality of radially extending engagement grooves in an inner surface thereof; and
      a pair of rotating shafts respectively adapted to rotatably couple the rotating shaft holding member to the rotating shaft supporting members and fitted in the rotating shaft holding member at opposite sides of the spring inserted in the rotating shaft holding member in such a fashion that they are axially slidable while being prevented from rotating with respect to the rotating shaft holding member, each of the rotating shafts being engaged with a selected one of the engagement grooves formed in an associated one of the rotating shaft supporting members.

26. The belt clip device according to claim 25, wherein each of the rotating shaft supporting members has a recessed structure for receiving and holding one end of an associated one of the rotating shafts, the rotating shaft end being protruded from the rotating shaft holding member, and each of the rotating shafts is provided with an engagement protrusion at one end thereof adapted to engage with a selected one of the engagement grooves formed in an associated one of the rotating shaft supporting members, thereby causing the terminal unit holder to be held at a position with respect to the clamp by the respective engagement groove engaged with the respective engagement protrusion.

27. A belt clip device for a mobile communication terminal unit comprising:
   a terminal unit holder configured to hold a terminal unit;
   a clamp provided adjacent to the terminal unit holder and configured to resiliently clip a belt worn by a user, between first and second clamp arms of the clamp;
   a connecting device configured to rotatably connect the clamp to the terminal unit holder, wherein the connecting device comprises:
      a hinging member arranged through the terminal unit adapter and the clamp, the hinging member being configured to be hingeably coupled to the first clamp arm of the clamp such that it is rotatable with respect to the clamp about a hinge shaft while being coupled to the terminal unit holder; and
      a rotating shaft for rotatably coupling a terminal unit holder to the hinging member such that the terminal unit holder rotates about the rotating shaft with respect to the hinging member; and an angular position holding device configured to hold an angular position of the terminal unit holder with respect to the hinging member, wherein the angular position holding device comprises:
- a hole formed in a surface of the terminal unit holder facing the clamp;
- a spring-loaded ball received in the hole such that it contacts with and is urged against a surface of the hinging member; and
- a plurality of engagement grooves formed in the surface of the hinging member and configured to receive and hold the spring-loaded ball, whereby the terminal unit holder is resiliently held at an angular position corresponding to a position of the spring-loaded ball received in a selected one of the engagement grooves.

28. A belt clip device for a mobile communication terminal unit comprising:
- a terminal unit holder configured to hold a terminal unit;
- a clamp provided adjacent to the terminal unit holder and configured to resiliently clip a belt worn by a user, between first and second clamp arms of the clamp; and
- a connecting device configured to rotatably connect the clamp to the terminal unit holder, wherein the connecting device comprises:
  - a cylindrical rotating shaft holding member provided at one end of the clamp;
  - a spring inserted in the rotating shaft holding member;
  - a pair or rotating shaft support members formed on the terminal holding unit, each of the rotating shaft supporting members being provided with a plurality of radially extending engagement grooves and an inner surface thereof; and
  - a pair of rotating shaft respectively configured to rotatably couple the rotating shaft holding member to the rotating shaft supporting members inserted in the rotating shaft holding member at opposite sides of the spring inserted in the rotating shaft holding member such that they are axially slidable while being prevented from rotating respective to the shaft holding member, each of the rotating shafts being engaged to a selective one of the engagement grooves formed in the associated one of the rotating shaft supporting members.

29. The belt clip device according to claim 28, wherein each of the rotating shaft supporting have a recessed structure configured to receive and hold one end of an associated one of the rotating shafts, the rotating shafts being configured to protrude from the rotating shaft holding member, wherein each of the rotating shafts is provided an engagement protrusion at one end thereof configured to engage the selective one of the engagement group formed in an associate one of rotating shaft supporting members, thereby causing the terminal unit holder to be held at a position with respect to the clamp.

30. The belt clip of claim 1, wherein the connector rotates in a plane which is at least substantially perpendicular to the plane extending substantially perpendicular to the front surface of the clamp.

\* \* \* \* \*